Nov. 25, 1930.                C. L. RUSSELL                1,783,141
                          CAGE FOR BALL BEARINGS
                           Filed Feb. 27, 1929
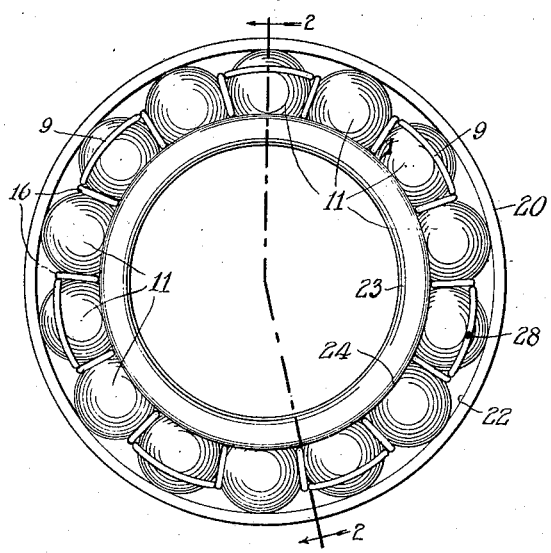
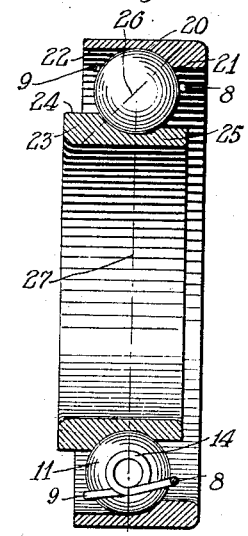
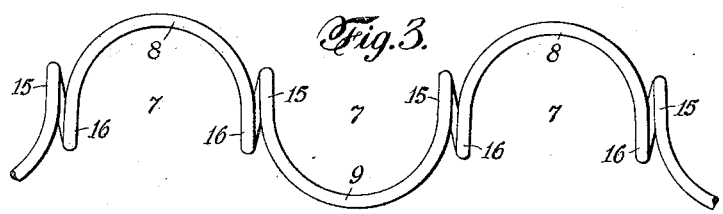
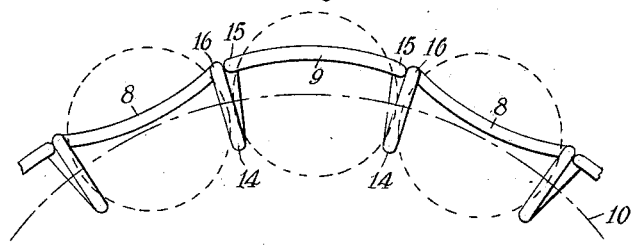
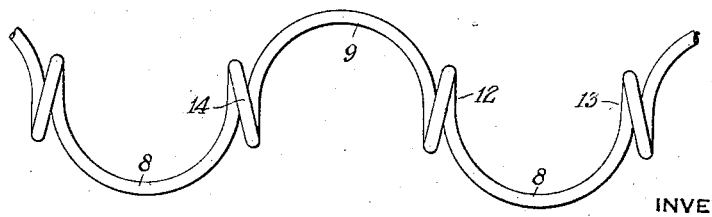
INVENTOR Patented Nov. 25, 1930

1,783,141

UNITED STATES PATENT OFFICE

CHARLES LYON RUSSELL, OF RAHWAY, NEW JERSEY, ASSIGNOR TO THE HESS-BRIGHT MANUFACTURING COMPANY, OF PHILADELPHIA, PENNSYLVANIA, A CORPORATION OF DELAWARE

CAGE FOR BALL BEARINGS

Application filed February 27, 1929. Serial No. 343,012.

The object of this invention is to provide a novel form of wire cage for use in radial ball bearings, one of the characteristics of the cage being its capability of holding the balls individually in its ball pockets. This feature facilitates the assembling of a set of balls in the cage, the ball filled cage becoming a handling unit either for immediate assembly with the race rings or for transportation to some other part of the factory.

This cage is primarily designed for use in "angular contact" bearings and is capable in such bearings of holding the set of balls assembled on the race of either the inner or the outer ring.

The spacing apart of the balls is controlled by the thickness of the wire. Consequently the thickness of the wire chosen for any particular cage will be determined by the distance the balls are intended to be spaced apart in the assembled bearing.

In the illustrated example the cage is used on a "full type" bearing, i. e., the bearing is furnished with the largest number of balls which can be placed in the race. As this term is now commonly used it indicates a bearing having a small amount of free space between the balls, the sum of such space being less than that required for the occupancy of an additional ball. Consequently the bearing has a full set or complement of balls.

Another characteristic of the "full type" bearing is that a ball cage is not usually employed, the balls being free. This, while presenting certain advantages, has the positive disadvantage of permitting the balls to group together and rub at one segment of their path and to be separated the entire amount of the inter-ball space at some other segment. Some users of ball bearings even desire to have no interspace when the bearing is unloaded, each ball normally touching its neighbors.

For use in certain fields a ball bearing has been developed having some of the features of a radial bearing and some of those of a cup and cone bearing. Among the latter may be mentioned the facility for taking heavy axial or thrust loads. When such a bearing is under any axial load the points of ball contact are on a line at an angle to the radius of the pitch circle of the set of balls. These bearings are known as angular contact bearings.

Each of the rings in this type of bearing has a high shoulder at one side, one of the rings having a very slight shoulder at one side and the other presenting a surface which is tangent to the bottom of the race groove. A cage is usually employed which cooperates with the shallow shoulder for holding the balls assembled on that ring when the other ring is removed.

In order to furnish a bearing of its type for carrying the heavy thrust loads or taking care of excessive shock loads manufacturers while recognizing the advantages flowing from the full type bearing have hesitated placing such a bearing on the market because of the difficulties experienced by the users in handling a separable type bearing having no means for retaining the balls on the race of one of the rings.

In the drawings accompanying this specification there is illustrated what is now believed to be the preferred form of the invention, in which drawings Figure 1 is an elevation of a ball bearing equipped with my improved cage, Fig. 2 is a section taken at about the plane of the line 2—2 of Figure 1, Fig. 3 is an enlarged detail of a section of the cage. In terms of Figs. 1 and 2 this is a top view.

Fig. 4 is a similar detail corresponding to the position of Figure 1, and

Fig. 5 is a view similar to Figs. 3 and 4 but what might be regarded as a bottom view of the detail shown in Fig. 4.

The cage is formed of a single piece of wire bent into loops to form ball pockets 7 opening from opposite sides alternately. The loops 8 and 9 on alternately opposite sides are adapted to lie outwardly of the pitch circle 10 of the balls 11. In this specification the term "pitch circle" is intended to refer to a circle passing through the centers of the balls of a ball bearing when in their proper position. The shortest line between the centers of two adjacent balls, passing as it does through the points where the balls most nearly approach one another, is located somewhat inwardly of such circle at these points.

Each of the loops 8 and 9 preferably approximates a segment of a circle of more than 180° and of less radius than half the ball diameter. Such loops partly surround the balls outwardly of the pitch circle of the bearing. The wire between each pair of loops 8 and 9 is bent into a helix on a smaller radius than such loops and somewhat more than a complete convolution. These helices 12 and 13 are left and right alternately and are for interposition between the balls for spacing and retaining them. In one aspect the ends of the loops overlap between the balls and continue in a complete turn extending below the pitch circle, so that between two adjacent balls inwardly of the pitch circle there is one turn 14 of the wire (see Fig. 5). Outwardly of the pitch circle there are two turns, 15, 16, (see Fig. 3). This construction presents two runs of the wire in the larger space on the outer side of the balls, and one run of wire on the smaller space on the inside.

By reference to Fig. 5 it will be seen that the runs of wire 14 are obliquely disposed and converge toward the open sides of the pockets, so that the balls are restrained from a tendency to pass out from the open sides of the loops 8 and 9.

By reference to Fig. 4 it will be seen that the balls where they approach each other enter into the center of the helices 12 and 13, and that a ball in attempting to pass inwardly from the pocket will be restrained because there is not sufficient space between the two runs 14 for it to squeeze past its neighbors, nor can it move outwardly because the runs 15 and 16 so fully occupy the space between adjacent balls that there is no room for passage in this direction.

The distance the balls are to be spaced apart determines the size of wire which is to be employed, and to some extent the size of the convolutions of the helices 12 and 13.

In Figs. 1 and 2 my invention is illustrated as applied to a bearing of the angular contact type in which there is an outer ring 20 having a high shoulder 21 at one side for receiving thrust, and no shoulder at all at the other side 22. The inner ring 23 has a high shoulder 24 at the side opposite the shoulder 21 and a low or shallow shoulder 25 at the other side. This type of bearing is usually mounted so that the line of contact 26 is at an angle to the radial line 27 of the bearing.

With a complete set of balls assembled on my improved cage, the cage and balls may be transported or freely moved from place to place with the balls held in position, and when so assembled they may readily be snapped over the shallow shoulder 25 of the inner ring and transported with that ring until the outer ring is placed in position. When the outer ring is removed from the balls, the inner ring and the cage is ample to retain them in position.

Sometimes the rigidity of the wire is sufficient to hold the ends together, otherwise they may be soldered together. Soldering is shown at 28 in Figure 1.

If the shoulder 25 is too high to permit the balls while assembled in the cage to be snapped together in position as a set, the balls may be individually snapped into the pockets of the retainer.

In a bearing in which high shoulders are provided on both sides of the ball groove in both races, of course the cage cannot be snapped onto the complete set when this is between the rings. But by means of a filling notch half the balls are placed in position by the Conrad eccentric method and the cage snapped on them from one side. Then the balance of the balls may be fed through the filling slot and into the pockets on the other side.

The present invention lends itself admirably to use in a full type angular contact bearing, even to one in which there is no interspace between the balls but in which they all actually touch one another.

It will be obvious to those skilled in this art that the present drawing is illustrative of my invention and that changes may be made within the scope of the claims without departing from the spirit of my invention.

Having thus described my invention, I claim and desire to secure by Letters Patent:

1. A ball cage for bearings, comprising a single wire bent into pocket forming loops opening alternately from opposite sides, the wire between each two adjacent loops being bent into a helix, each two adjacent helices being capable of retaining a ball in the appurtenant pocket.

2. A ball cage for bearings, comprising a single wire bent into pocket forming loops opening alternately from opposite sides, the wire between each two adjacent loops being bent into a helix, each pair of helices entering into each pocket being respectively right and left convolutions.

3. A ball cage for bearings, comprising a single wire bent into pocket forming loops opening alternately from opposite sides, the wire between each two adjacent loops being bent into a helix, each pair of helices entering into each pocket being respectively right and left convolutions having their lower portions obliquely disposed and converging toward the open sides of the pockets.

4. A ball cage for bearings, comprising a single wire bent to form ball pockets opening alternately from opposite sides, and constructed and adapted to hold a set of balls as a handling unit.

5. A ball cage for bearings, comprising a single wire bent into pocket forming loops opening alternately from opposite sides, the wire between each two adjacent loops being bent into a helix, two runs of wire being disposed between adjacent pockets outwardly of the pitch circle, and one run inwardly thereof.

6. A ball cage for bearings, comprising a single wire bent into pocket forming loops opening alternately from opposite sides, the ends of the loops overlapping between the pockets outwardly of the pitch circle and bent into a helix extending inwardly of the pitch circle.

7. A ball cage for bearings, comprising a single wire bent into pocket forming loops opening alternately from opposite sides, the ends of the loops overlapping between the pockets outwardly of the pitch circle and bent into a helix extending inwardly of the pitch circle, each pair of helices entering into each pocket being respectively right and left convolutions having their lower portions obliquely disposed and converging toward the open sides of the pockets.

Signed at New York, N. Y. this 26th day of February, 1929.

CHARLES LYON RUSSELL.